D. P. NICKERSON.
Car Wheel.
No. 65,109. Patented May 28, 1867.
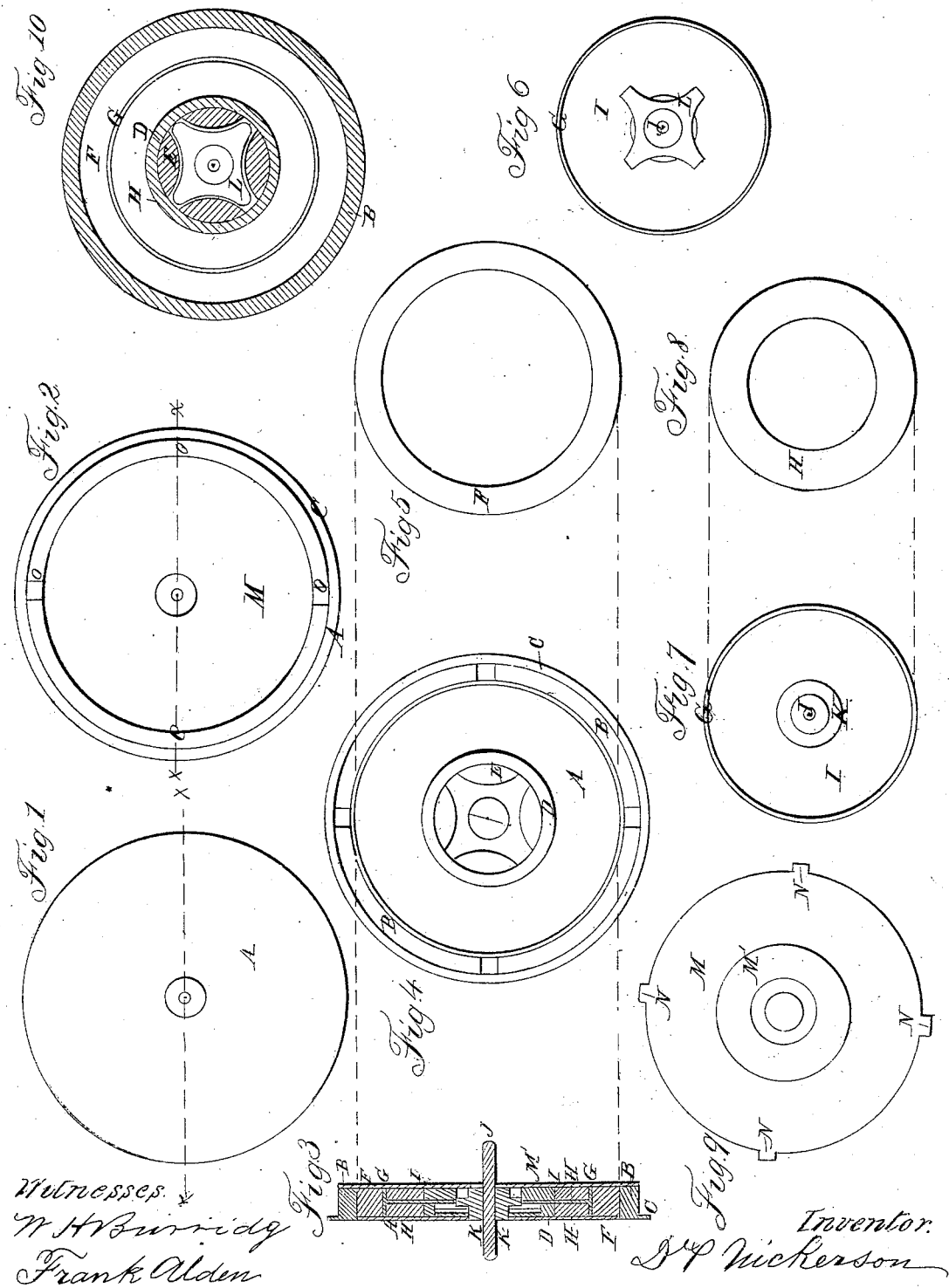

United States Patent Office.

D. P. NICKERSON, OF CLEVELAND, OHIO.

Letters Patent No. 65,109, dated May 28, 1867.

---

IMPROVED CAR-WHEEL.

---

*The Schedule referred to in these Letters Patent and making part of the same.*

---

TO ALL WHOM IT MAY CONCERN:

Be it known that I, D. P. NICKERSON, of Cleveland, in the county of Cuyahoga, and State of Ohio, have invented certain new and useful improvements in Railroad Car-Wheels; and I do hereby declare that the following is a full and complete description of the same, reference being had to the accompanying drawings, making a part of this specification, in which—

Figure 1 is a side view of the wheel.

Figure 2 is a view of the opposite side of fig. 1.

Figure 3 is a transverse section of figs. 1 and 2, in the direction of the line $x\ x$.

Figure 4 is a view of the wheel with the internal arrangement detached.

Figure 10 is a view of the wheel with the internal arrangement in place.

The other figures are detached sections, to which reference will be had in the description.

Like letters of reference refer to like parts in the different views.

This wheel consists of the shell A, fig. 4, provided with a deep rim, B, which forms the tread of the wheel, and a flange, C, by which it is kept on the rail. D is an annular shoulder, and E a section of a segment-clutch, the purpose of which will hereafter be shown. Immediately within the rim B is placed a rubber F, Figure 5, the thickness of which being equal to the depth of the rim and shoulder E. This ring is supported from the centre by the annular metallic shoulder G, Figure 6, encompassed by the ring, as shown in fig. 10. Within the shoulder G is fitted another rubber ring, H, Figure 8, which is supported from the centre by the shoulder D, by which it is embraced, as shown in fig. 10. This figure shows the relative position of the rim and rings and shoulders to each other when arranged in their order for practical use. The shoulder D is constructed with a central disk, I, as shown in fig. 3, in which it will be seen that the rim forming the shoulder projects from each side of the central disk, and that each side alike is provided with a ring, all of which are supported by a shaft, J, which forms the axle of the wheel, and is braced and secured by the hub K. On one arm of the axle is keyed or otherwise secured the corresponding or relative part L of the clutch E, and which two parts are made to engage when the wheel is put together, as shown in fig. 3, in which is shown a transverse view of the relative position of the several parts of the wheel. The side plate M, Figure 9, which is seen in position in fig. 2, is provided with a shoulder, M', corresponding with the annular shoulder, D, and which holds the same relation to the wheel. This plate is secured in place by the lugs N or any other suitable means. These lugs are made to slide under a slotted rib, O, so constructed with an inclination downward as to draw the plate down upon the shoulders and rings, thereby holding them securely and snugly in place, but not so tight as to prevent any expansion or contraction of the springs. These lugs, when properly secured under the ribs, are prevented from working out by a pin or screw being inserted through them into the rim of the wheel. By the use of this peculiar wheel it will be evident that the weight of the car is supported by the concentric rubber springs and shoulders from which it is transmitted to the rim of the wheel instead of being applied to the wheel directly. As the weight bears down upon the axle it draws down upon the ring H by means of the projecting rims of the disk, to which disk the axle is connected, as above described. This downward draught is resisted by the outer ring F as the weight is being borne down upon it. Thus the weight is suspended upon the inner ring and supported from below by the outer. In this way the carriage is rolled along on a continuously revolving spring applied to the inner side of the wheel as it is made to run by being coupled to the disk and the internal arrangement of the clutches above described.

By the use of a wheel constructed in this way the ordinary springs are dispensed with, the wheels run with less friction against the sides of the rails, and more especially when running on a curve, as they more readily adjust themselves to the direction of the rail. It also lessens the downward beating of the tread of the wheels upon the faces of the rails on passing over the ends or when running over the frogs on being switched off on the side tracks or turn-outs.

What I claim as my improvement, and desire to secure by Letters Patent, is—

1. The shell A, elastic ring F, and disk I, provided with the shoulder or flange C, in combination with the elastic rings H.

2. The clutches L E and disk, in combination with the elastic rings and shell A, substantially as and for the purpose set forth.

3. The annular shoulders D M', rings H, plate M, and shell A, arranged substantially as and for the purpose set forth.

D. P. NICKERSON.

Witnesses:
W. H. BURRIDGE,
E. E. WAITE.